(12) United States Patent
Song et al.

(10) Patent No.: US 9,019,645 B1
(45) Date of Patent: Apr. 28, 2015

(54) APPLYING DIGITAL FREQUENCY OFFSET TO TIMING LOOP

(71) Applicant: Marvell International Ltd., Hamilton (BM)

(72) Inventors: Hongxin Song, Sunnyvale, CA (US); Qiyue Zou, San Jose, CA (US); Michael Madden, Mountain View, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/325,742

(22) Filed: Jul. 8, 2014

Related U.S. Application Data

(60) Provisional application No. 61/844,358, filed on Jul. 9, 2013, provisional application No. 61/936,748, filed on Feb. 6, 2014.

(51) Int. Cl.
*G11B 5/09* (2006.01)
*G11B 20/20* (2006.01)
*G11B 20/10* (2006.01)

(52) U.S. Cl.
CPC .............................. *G11B 20/10231* (2013.01)

(58) Field of Classification Search
None
See application file for complete search history.

(56) References Cited

U.S. PATENT DOCUMENTS

| | | | |
|---|---|---|---|
| 6,009,549 A * | 12/1999 | Bliss et al. | 360/51 |
| 6,307,900 B1 * | 10/2001 | Choi | 375/341 |
| 6,900,676 B1 * | 5/2005 | Tamura | 327/156 |
| 2003/0076903 A1 * | 4/2003 | Ashley et al. | 375/326 |
| 2003/0137765 A1 * | 7/2003 | Yamazaki et al. | 360/39 |

* cited by examiner

*Primary Examiner* — Thang Tran

(57) ABSTRACT

A system for providing an accumulated phase to an interpolator of a read channel, the interpolator configured to provide a digital clock signal. A frequency accumulator is configured to generate a frequency offset based on a difference between the digital clock signal and a desired clock signal. A zero phase start module is configured to, during a zero phase start, output an incremental phase jump. A phase accumulator is configured to generate the accumulated phase based on the difference between the digital clock signal and the desired clock signal, and, during the zero phase start, the incremental phase jump output by the zero phase start module, or the frequency offset generated by the frequency accumulator or a predetermined frequency offset.

20 Claims, 4 Drawing Sheets

APPLYING DIGITAL FREQUENCY OFFSET TO TIMING LOOP

CROSS-REFERENCE TO RELATED APPLICATIONS

This application claims the benefit of U.S. Provisional Application No. 61/844,358, filed on Jul. 9, 2013 and U.S. Provisional Application No. 61/936,748, filed on Feb. 6, 2014. The entire disclosures of the applications referenced above are incorporated herein by reference.

FIELD

The present disclosure relates to systems and methods for generating a digital clock signal according to a timing loop, and more particularly to injecting a digital frequency offset into the timing loop.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A digital clock signal (e.g., a digital clock signal used for timing functions, such as recovering timing of a read channel, in a hard disk drive) may be generated by interpolating an output of a voltage controlled oscillator (VCO) according to a digital phase adjustment provided by a timing loop. The digital clock signal may be required to operate within a range between a minimum clock rate ($clock_{min}$) and a maximum clock rate ($clock_{max}$). In other words, the digital clock signal may be required to be adjustable between $clock_{min}$ and $clock_{max}$.

Typically, the VCO operates at a fixed frequency (i.e., the output of the VCO may have a fixed frequency $f_{VCO}$), and/or changing the frequency of the output of the VCO may be difficult. Further, changing the frequency of the output of the VCO may introduce a transient in the output frequency. This transient is not appropriate for some applications, e.g., when a quick or even instantaneous frequency update is needed, or during ongoing read or write operations. Accordingly, a frequency offset $\Delta f$ may be incorporated by the timing loop to change the rate of the digital clock signal without changing the frequency of VCO output.

FIG. 1 shows an example system 100 including a timing loop 104 (e.g., a digital portion of the system 100) that provides a digital phase adjustment to an analog portion 108 of the system 100. The analog portion 108 includes a VCO 112 that generates, based on an input voltage, an analog signal having a frequency $f_{VCO}$. An interpolator 116 interpolates the analog signal according to a phase adjustment provided by the timing loop 104 to generate a digital clock signal having a desired phase and frequency.

The timing loop 104 (which corresponds to, for example only, a second order timing loop) receives a timing error e corresponding to a difference between a desired signal value and an actual signal value (e.g., of a signal corresponding to the digital clock signal generated by the interpolator 116). The timing error e includes each of phase error information and frequency error information associated with the digital clock signal. The timing loop 104 includes a frequency loop portion 120 and a phase loop portion 124.

The frequency loop portion 120 receives the timing error "e" as modified by a coefficient $\beta$, which is selected to convert the timing error e into a corresponding frequency error. For example, multiplier 128 multiplies the timing error e by the coefficient $\beta$. A frequency accumulator 132 generates a frequency offset $\Delta f$ based on the frequency error, which is fed back to be summed with the frequency error by summer 136.

The phase loop portion 124 receives the timing error e as modified by a coefficient $\alpha$, which is selected to convert the timing error e into a corresponding phase error. For example, multiplier 140 multiplies the timing error e by the coefficient $\alpha$ to generate phase error, which is summed with the frequency offset $\Delta f$ at summer 144. A phase accumulator 148 generates an accumulated phase $\phi$ based on an output of summer 152, which sums the output of the summer 144, the output of the phase accumulator 148, and a zero phase start (ZPS) phase jump $\phi_{ZPS}$. The phase $\phi$ is provided to the interpolator 116 to adjust the phase of the digital clock signal. For example only, for a clock period T of the digital clock signal, increasing the phase $\phi$ may delay the digital clock signal (e.g., by up to 1 T). The achievable range for the frequency of the digital clock signal may correspond to $[f_{VCO}*(1+\Delta f_{min}), f_{VCO}*(1+\Delta f_{max})]$, where $\Delta f_{min}$ and $\Delta f_{max}$ correspond to a minimum frequency offset and a maximum frequency offset, respectively. Accordingly, the values $\Delta f_{min}$ and $\Delta f_{max}$ determine the ability of the timing loop to operate between the required minimum clock rate $clock_{min}$ and maximum clock rate $clock_{max}$.

A (Zero Phase Start) ZPS module 156 generates the ZPS phase jump $\phi_{ZPS}$. For example, the ZPS module 156 generates the ZPS phase jump $\phi_{ZPS}$ based on an evaluation of phase information of an underlying sinusoidal waveform. For example, one period of the sinusoidal waveform (e.g., corresponding to a read signal read from a storage medium of the HDD) includes four desired sampling points corresponding to a 0, a positive peak, a 0, and a negative peak. The ZPS module 156 performs the ZPS to cause the sampling phase to coincide with the desired sampling points of the sinusoidal waveform. For example, the ZPS module 156 may calculate a total phase jump value $\psi$, which may have a range of, for example only, $[-1, 0]$ or $[0, 1]$ (i.e., a total of 1 T). The total phase jump value $\psi$ may be divided into N steps (i.e., N different phase jumps $\phi_{ZPS}$), where the sum of the N phase jumps equals the total phase jump value $\psi$ (i.e., $\psi = \Sigma \phi_{ZPS}$). In other words, the ZPS module 156 outputs N phase jumps of $\phi_{ZPS}$ to the summer 152 over N consecutive clock cycles to provide the total phase jump value $\psi$. Accordingly, if $\psi$ is within the range of $[0, 1]$ and $N=4$, then the range of each individual one of the N jumps $\phi_{ZPS}$ may be in $[0, \frac{1}{4}]$.

SUMMARY

A system for providing an accumulated phase to an interpolator of a read channel, the interpolator configured to provide a digital clock signal, includes a frequency accumulator configured to generate a frequency offset based on a difference between the digital clock signal and a desired clock signal. A zero phase start module is configured to, during a zero phase start, output an incremental phase jump. A phase accumulator is configured to generate the accumulated phase based on the difference between the digital clock signal and the desired clock signal, and, during the zero phase start, the incremental phase jump output by the zero phase start module, or the frequency offset generated by the frequency accumulator or a predetermined frequency offset.

A method for providing an accumulated phase to an interpolator of a read channel, the interpolator configured to provide a digital clock signal, includes generating a frequency offset based on a difference between the digital clock signal and a desired clock signal, and, during a zero phase start, outputting an incremental phase jump. The method further includes generating the accumulated phase based on the difference between the digital clock signal and the desired clock signal, and, during the zero phase start, the incremental phase jump, the generated frequency offset, or a predetermined frequency offset.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Figure 1:
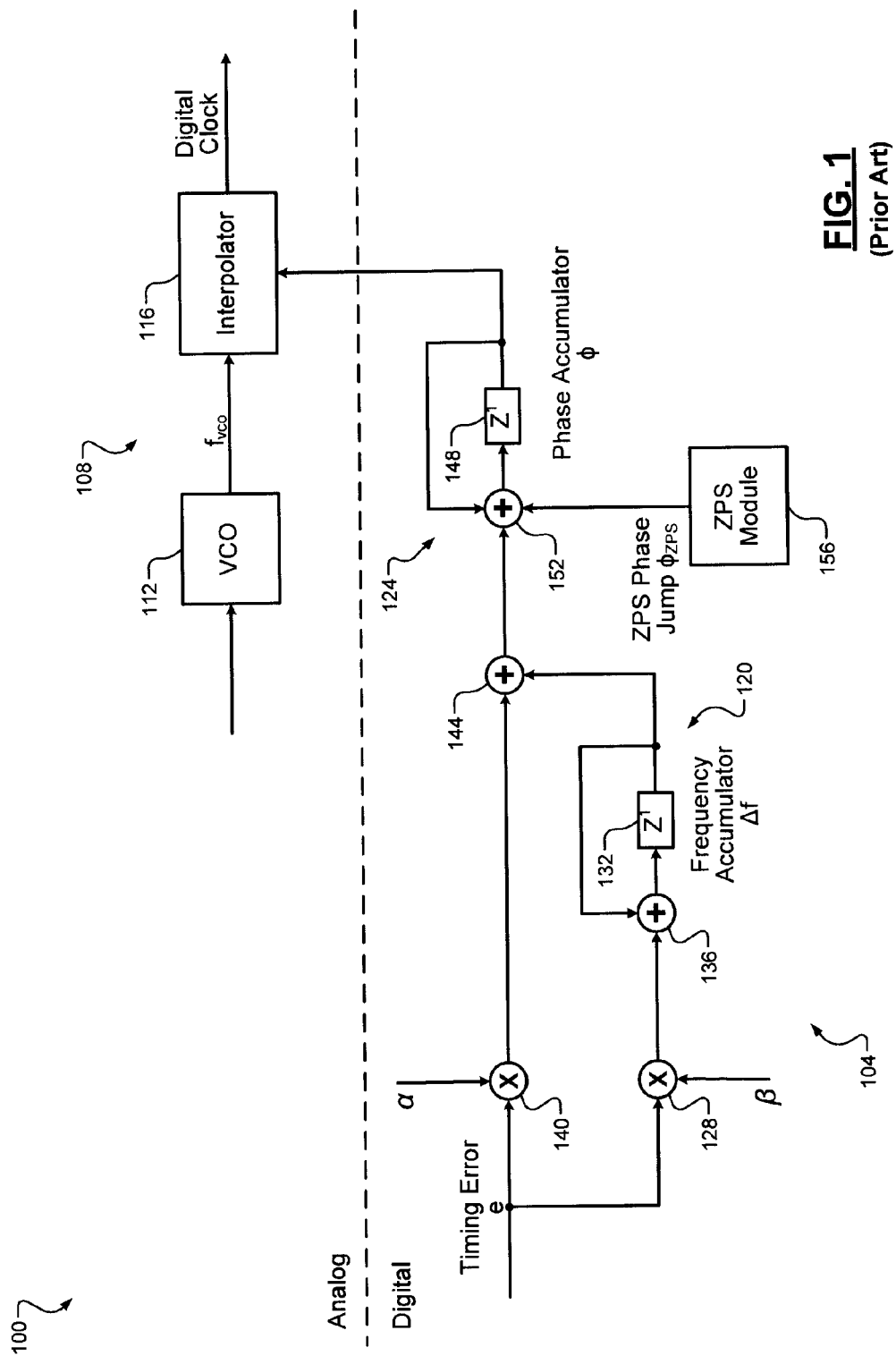
FIG. 1 is an example system including a timing loop according to the prior art.

In a system implementing a timing loop to recover timing of a read channel, a total phase jump $\Omega$ may be injected over N clocks cycles according to the equation $\phi(t)=\phi(t-1)+\Delta\phi(t)$, where a phase change rate $\Delta\phi(t)=\Delta f(t)+\alpha^*e(t)+\phi_{ZPS}(t)$, and where $\phi_{ZPS}(t)$ corresponds to the ZPS phase jump. Prior to ZPS, $e(t)=0$ and $\phi_{ZPS}(t)=0$, so $\Delta f(t)=\Delta f(t)$. During ZPS $e(t)=0$, so $\Delta\phi(t)=\Delta f(t)+\phi_{ZPS}(t)$. Subsequent to the zero phase start being completed, $\phi_{ZPS}(t)=0$, so $\Delta\phi(t)=\Delta f(t)+\alpha^*e(t)$. The $\alpha^*e(t)$ term corresponds to a timing loop adaptation contribution. If a phase change rate $\Delta\phi(t)$ exceeds a certain range, operational glitches in an analog portion of the system may occur. For example, typically it is desirable for $\Delta\phi(t)$ to be within $[\Delta\phi_{min}, \Delta\phi_{max}]$. Therefore, a working range of $\Delta f$ is limited according to the constraints on $\Delta\phi(t)$.

During a zero phase start, in an example where $\Delta\phi_{min}=-1/16$ and $\Delta\phi_{max}=5/16$, $\phi_{ZPS}(t)$ may be required to be within a range defined by $0<=\phi_{ZPS}(t)<=1/4$. Accordingly, a working range for a frequency offset $\Delta f$ is defined by a minimum frequency offset $\Delta f_{min}$, corresponding to $\Delta f_{min}=\Delta\phi_{min}-\phi_{ZPS}(t)$, or $-1/16-1/4$ (i.e., $-5/16$), and a maximum frequency offset $\Delta f_{max}$, corresponding to $\Delta f_{max}=\Delta\phi_{max}-\phi_{ZPS}(t)$, or $5/16-1/4$ (i.e., $1/16$).

Subsequent to the zero phase start, in the example where $\Delta\phi_{min}=-1/16$ and $\Delta\phi_{max}=5/16$, $\alpha^*e(t)$ may be required to be within a range defined by $-1/64=\alpha^*e(t)<=1/64$ (corresponding to a minimum $\alpha^*e(t)$, or $\min(\alpha^*e(t))$, of $-1/64$ and a maximum $\alpha^*e(t)$, or $\max(\alpha^*e(t))$, of $1/64$). Accordingly, the working range for the frequency offset $\Delta f$ is defined by the minimum frequency offset $\Delta f_{min}$, corresponding to $\Delta f_{min}=\Delta\phi_{min}-\min(\alpha^*e(t))$, or $-1/16-(-1/64)$ (i.e., $-3/64$), and a maximum frequency offset $\Delta f_{max}$, corresponding to $\Delta f_{max}=\Delta\phi_{max}-\max(\alpha^*e(t))$, or $5/16-1/64$ (i.e., $19/64$).

The minimum and maximum frequency offsets must meet the range requirements for each of the ranges during the zero phase start (i.e., $0-1/16, 1/16$) and subsequent to the zero phase start (i.e., $-3/64, 19/64$). Accordingly, the minimum and maximum frequency offsets $\Delta f_{min}$ and $\Delta f_{max}$ are constrained by $(-3/64, 1/16)$.

Systems and methods according to embodiments of the present disclosure increase the working range of the frequency offset $\Delta f$. For example, a total desired phase increase $\Omega$ during N phase jumps (i.e., N incremental jumps over N clock cycles) of the ZPS corresponds to $\Omega=N^*\Delta f+\psi$, where $\Delta f$ is constant during the N phase jumps. The N phase jumps (i.e., increments) during the ZPS correspond to $\Delta f+\phi_{ZPS, 0}$, where $\phi_{ZPS, 0}$ corresponds to a first ZPS phase jump value, $\Delta f+\phi_{ZPS, 1}, \ldots$, and $\Delta f+\phi_{ZPS, N-1}$. However, instead of attempting to increase the phase by the total desired phase increase $\Omega$ during ZPS, the phase increase $\Omega$ may be reduced by an integer number (e.g., correspond to a number of clock cycles) to $\Omega'$ (e.g., from 1.6 to 0.6).

For example, if N=4, $\phi_{ZPS}$ is within $[0, 1/4]$, $\psi$ is within $[0, 1]$, $\Delta\phi_{min}=-1/16$, and $\Delta\phi_{max}=5/16$, $\Omega'=\Omega-k$, where k=an integer part of $\Omega$ (e.g., if the total phase jump $\Omega$ is 1.6, then k=1, and $\Omega'=0.6$). Further, the integer k can be used to adjust a system framing (i.e., perform reframing) associated with the timing loop (e.g., expected peaks or 0s of a sampled sinusoidal waveform). Accordingly, an adjusted incremental phase jump $\phi'_{ZPS}$ can be calculated such that $\Sigma\phi'_{ZPS}=\Omega'$. In other words, if N=4 and $\Omega'=0.6$, then $\phi'_{ZPS}=0.6/4$, or 0.15, and therefore is within a range defined by $[0, 1/4]$. In this manner, the adjusted incremental phase jump $\phi'_{ZPS}$ is applied to the timing loop over N clock cycles of the ZPS to achieve a total phase jump of 0.6 without exceeding the range $[0, 1/4]$ for each $\phi'_{ZPS}$. Further, during the ZPS, the timing loop is modified such that the frequency offset $\Delta f$ is not accumulated into the phase offset.

Figure 2:
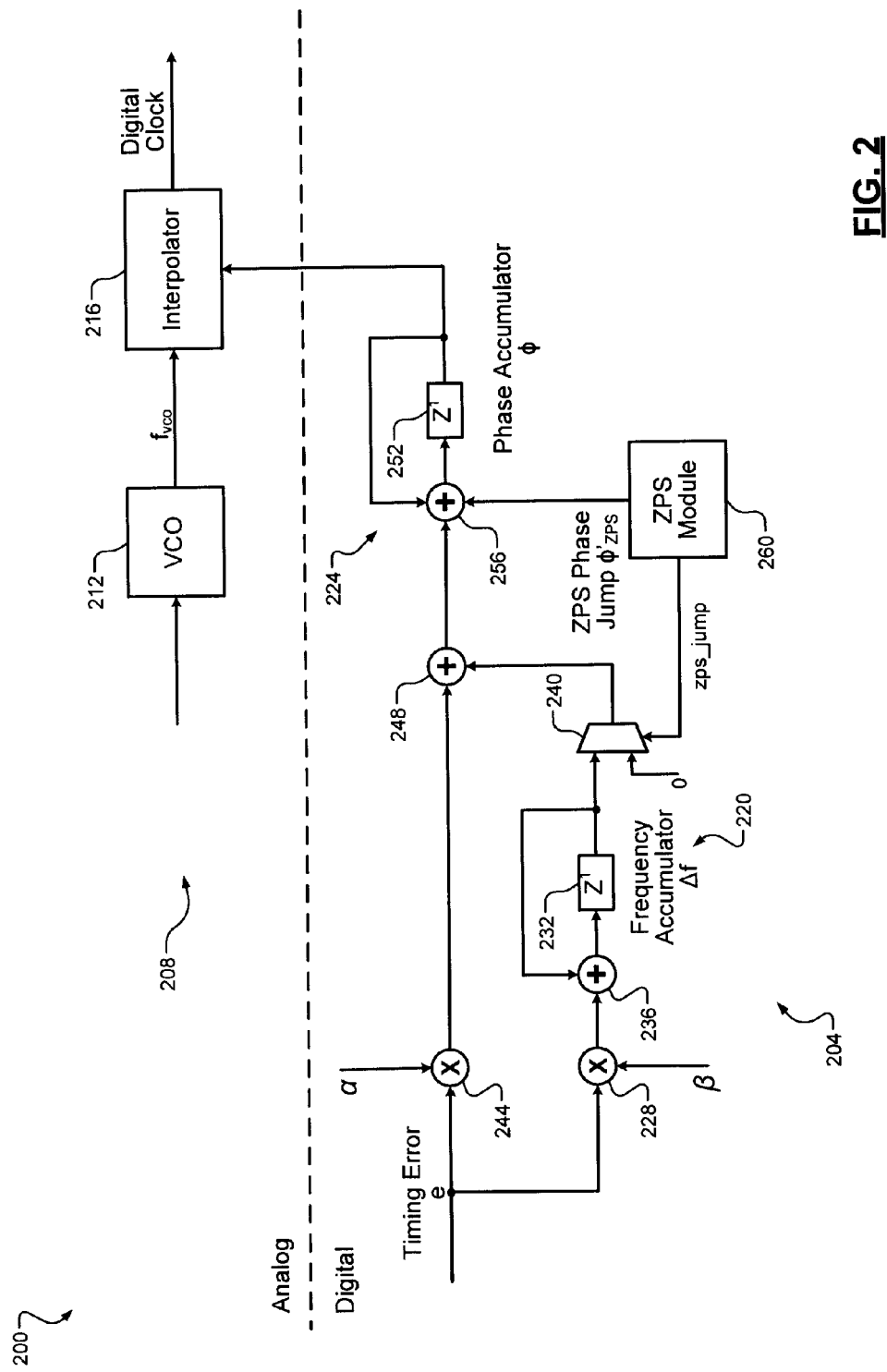
FIG. 2 is an example system including a timing loop according to an embodiment of the present disclosure.

FIG. 2 shows an example system 200 including a timing loop 204 (e.g., a digital portion of the system 100) that provides a digital phase adjustment to an analog portion 208 of the system 100. The analog portion 208 includes a VCO 212 that generates, based on an input voltage, an analog signal having a frequency $f_{VCO}$. An interpolator 216 interpolates the analog signal according to a phase adjustment provided by the timing loop 204 to generate a digital clock signal having a desired phase and frequency.

The timing loop 204 (which corresponds to, for example only, a second order timing loop) receives a timing error e corresponding to a difference between a desired signal value and an actual signal value (e.g., of a signal corresponding to the digital clock signal generated by the interpolator 216). The timing error e includes each of phase error information and frequency error information associated with the digital clock signal. The timing loop 204 includes a frequency loop portion 220 and a phase loop portion 224.

The frequency loop portion 220 receives the timing error e as modified by a coefficient $\beta$, which is selected to convert the timing error e into a corresponding frequency error. For example, multiplier 228 multiplies the timing error e by the coefficient $\beta$. A frequency accumulator 232 generates a frequency offset $\Delta f$ based on the frequency error, which is fed back to be summed with the frequency error by summer 236. In some embodiments, the frequency offset $\Delta f$ may be provided (e.g., programmed or predetermined) by a user.

A multiplexer 240 receives the output of the frequency accumulator 232 and a "0" input, and a ZPS selection signal zps_jump. The ZPS selection signal selects between the output of the frequency accumulator 232 and the 0. For example, when the ZPS selection signal is 0, indicating that a ZPS phase jump is not being performed, the multiplexer 240 passes the output of the frequency accumulator 232 (i.e., the frequency offset $\Delta f$). Conversely, when the ZPS selection signal is 0, indicating that a ZPS phase jump is being performed, the multiplexer 240 passes the 0. Accordingly, during ZPS (i.e., during ZPS phase jumps), the multiplexer 240 outputs a 0 and the frequency offset Δf as output by the multiplexer 240 is excluded from being accumulated into the phase information provided to the interpolator 216. Instead, the frequency offset Δf is incorporated into an adjusted incremental phase jump $\phi'_{ZPS}$.

The phase loop portion 224 receives the timing error e as modified by a coefficient α, which is selected to convert the timing error e into a corresponding phase error. For example, multiplier 244 multiplies the timing error e by the coefficient α to generate phase error, which is summed with the output of the multiplexer 240 (i.e., 0 during the ZPS and the frequency offset Δf after the ZPS is complete) at summer 248. A phase accumulator 252 generates an accumulated phase φ based on an output of summer 256, which sums the output of the summer 248, the output of the phase accumulator 252, and the adjusted incremental ZPS phase jump $\phi'_{ZPS}$. The phase φ is provided to the interpolator 216 to adjust the phase of the digital clock signal.

A ZPS module 260 generates the adjusted incremental ZPS phase jump $\phi'_{ZPS}$ according to an embodiment of the present disclosure. For example, the ZPS module 260 calculates and outputs the adjusted incremental ZPS phase jump $\phi'_{ZPS}$ as described above over N clock cycles, where $\Sigma\phi'_{ZPS}$ over N clock cycles corresponds to Ω', where Ω'=Ω−k, where Ω=N*Δf+ψ, and k is the integer part of Ω. For example only, the ZPS module 260 may also generate the ZPS selection signal zps_jump.

Accordingly, using the example values provided above, the working range for Δf now corresponds to the minimum frequency offset and the maximum frequency offset subsequent to the ZPS, and the constraints on the working range for Δf during ZPS are excluded. In other words, the only constraints on the working range of Δf are the minimum frequency offset $\Delta f_{min}$ corresponding to $\Delta f_{min}=\Delta\phi_{min}-\min(\alpha*e(t))$, or −1/16−(−1/64) (i.e., −3/64), and the maximum frequency offset $\Delta f_{max}$ corresponding to $\Delta f_{max}=\Delta\phi_{max}-\max(\alpha*e(t))$, or 5/16−1/64 (i.e., 19/64), resulting in an increase from 1/16 to 19/64 for the maximum frequency offset.

The output frequency $f_{VCO}$ of the VCO may be selected to further maximize a frequency range $[\Delta f_{min}, \Delta f_{max}]$. Accordingly, $f_{VCO}$ is selected based on a middle point of $\Delta f_{min} \Delta\phi_{min}$ and $\Delta f_{max} \Delta\phi_{max}$ (e.g., using arithmetic averaging, geometric averaging, etc.), and $f_{VCO}$ may be set such that a biasing digital frequency component equal to approximately $(\Delta\phi_{min}+\Delta\phi_{max})/2$ is applied to achieve the desired $f_{VCO}$.

For example only, an example desired range [$clock_{min}$, $clock_{max}$] of the digital clock signal corresponds to [900 MHz, 1100 MHz], where $\Delta f_{min}=\Delta\phi_{min}-\min(\alpha*e(t))$, or −1/16−(−1/64) (i.e., −3/64), and $\Delta f_{max}=\Delta\phi_{max}-\max(\alpha*e(t))$, or 5/16−1/64 (i.e., 19/64). Accordingly, the arithmetic middle point of $\Delta f_{min}$ and $\Delta f_{max}$ corresponds to (−3/64+1/4)/2=13/128, and the arithmetic middle point of [$clock_{min}$, $clock_{max}$] corresponds to (900+1100)/2=1000 MHz. The output frequency $f_{VCO}$ then corresponds to $f_{VCO}$=sqrt($clock_{min}*clock_{max}$)/(1+($\Delta f_{min}+\Delta f_{max}$)/2), or 1000/(1+13/128)=907.8 MHz. As such, the frequency offset Δf for the $clock_{min}$ of 900 MHz corresponds to −0.0086, the Δf for the middle point clock of 907.8 MHz corresponds to 0, and the Δf for the $clock_{max}$ of 1100 MHz corresponds to 0.2117.

Accordingly, the supported digital clock frequency range with an α*e range of [−1/64, 1/64]=[$f_{VCO}*\Delta f_{min}$, $f_{VCO}*\Delta f_{max}$], or [865.2 MHz, 1134.8 MHz]. Alternatively, within a clock range of [900 MHz, 1100 MHz], the range of α*e can be increased from [−1/64, 1/64] to [−0.0539, 0.0539].

Figure 3:
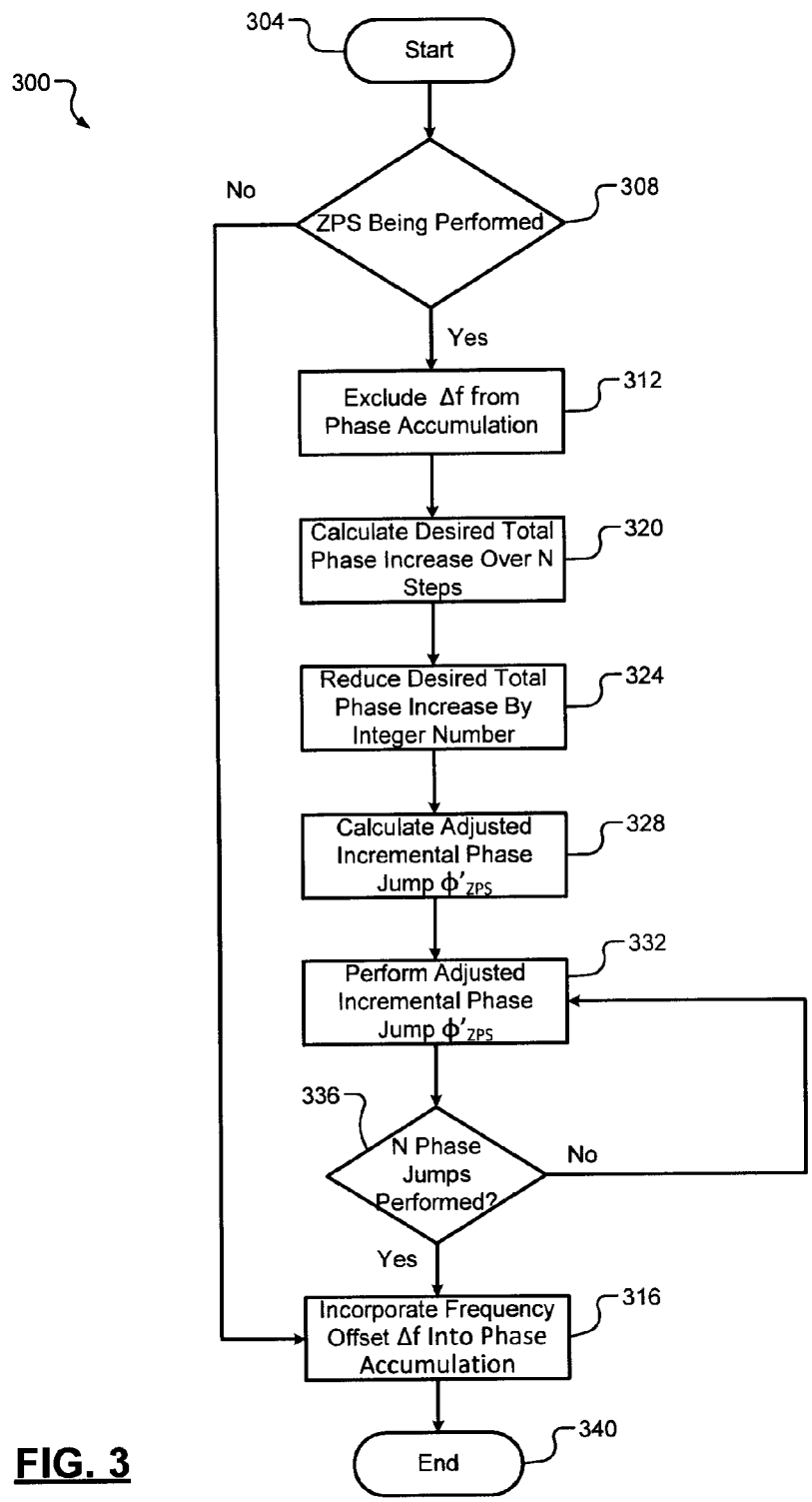
FIG. 3 is an example zero phase start adjustment method according to an embodiment of the present disclosure.

FIG. 3 shows an example ZPS adjustment method 300. For example only, the method 300 is performed by components of the timing loop 204, including the ZPS module 260. The method 300 starts at 304. At 308, the method 300 determines whether the ZPS is being performed. If true, the method 300 continues to 312. If false, the method 300 continues to 316.

At 312, the method 300 excludes the frequency offset Δf provided by the frequency accumulator 232 from phase accumulation (e.g., by selecting a "0" to be output from a multiplexer instead of the frequency offset Δf). At 320, the method 300 calculates a desired total phase increase Ω to be applied over N steps (e.g., clock cycles). For example only, Ω=N*Δf+ψ. At 324, the method 300 reduces the desired total phase increase Ω by an integer number (e.g., by 1, 2, 3, etc.) to Ω'. At 328, the method 300 calculates an adjusted incremental phase jump $\phi'_{ZPS}$, where ΣΦ'zps=Ω'. At 332, the method 300 performs the adjusted incremental phase jump $\phi'_{ZPS}$. At 336, the method 300 determines whether N of the adjusted incremental phase jumps $\phi'_{ZPS}$ have been performed. If true, the method 300 continues to 316. If false, the method 300 continues to 332. At 316, the method 300 incorporates the frequency offset Δf provided by the frequency accumulator 232 into phase accumulation (e.g., by selecting the frequency offset Δf to be output from the multiplexer instead of the "0"). The method ends at 340.

In some implementations, the frequency of the digital clock signal output by the interpolator 216 can be adjusted by injecting an additional frequency offset. Accordingly, the accumulated phase φ output by the phase accumulator 252 to shift the phase of the digital clock signal may need to be adjusted to compensate for the additional frequency offset injected into the digital clock signal.

For example, if a 1% phase shift is injected into the digital clock signal with every clock cycle, the resulting digital clock signal will effectively have a 1% frequency offset. For a digital clock signal having a period of $T_{VCO}$, the interpolator 216 is configured to shift rising edges or falling edges of the digital clock signal by 1% to cause a 1% frequency offset (e.g., a 1% higher (or lower) frequency, corresponding to a 1% shorter (or longer) adjusted period $T_{INT}$). Accordingly, for a 1% shift, $T_{INT}$=0.99$T_{VCO}$. The interpolator 216 can shift the digital clock signal either forward or backward.

The ZPS module 260 therefore may provide a phase jump that incorporates both the ZPS phase jump as described above in FIGS. 2 and 3 as well as a correction factor to compensate for the frequency offset injected by the interpolator 216. The resulting adjusted incremental phase jump $\phi'_{ZPS}$ provided by the ZPS module 260 during the ZPS may exceed operational limits of the interpolator 216. For example, the interpolator 216 may be limited to performing a phase jump that is less than one clock period (for example only, 0.875 T). Accordingly, the timing loop 204 according to the principles of the present disclosure is configured to determine a total phase jump to be performed (i.e., compensating for the additional frequency offset and incorporating the adjusted incremental phase jump $\phi'_{ZPS}$) and perform the phase jump over multiple clock cycles. Further, in the presence of the additional frequency offset injected by the interpolator 216, the phase jump provided by the ZPS module 260 may be modified by a correction factor.

For example, the period $T_{VCO}$ corresponds to M time increments (ticks). For example only, M is 128, and one tick corresponds to 1/128*$T_{VCO}$. For an example total phase jump ψ (e.g., 0.2 T, 0.4 T, etc.), ψ is converted to a corresponding number of the total number of M ticks (i.e., 124 out of the 128 ticks). If the interpolator 216 injects a frequency offset Δf (e.g., corresponding to 4 ticks), the interpolator period $T_{INT}$ corresponds to 128+4, or 132, ticks (or 128−4, or 124, ticks, depending on whether the frequency offset is positive or negative). Accordingly, the total phase jump performed by the ZPS module 260 is first modified by a correction factor (1−Δf) according to ψ*(1−Δf), where Δf corresponds to the desired frequency offset (which can be positive or negative) to be injected by the interpolator 216. For example only, the modified total phase jump is represented as ψ'. If Δf is 0, then the total phase jump ψ' merely corresponds to ψ. Conversely, if Δf is 1% and $T_{VCO}$=128 ticks, then ψ'=ψ*(1−1%). In this manner, the phase jump ψ' provided by the ZPS module 260, which corresponds to a clock domain of the interpolator 216, is converted, using the correction factor, to a clock domain of $f_{VCO}$. In other words, if $T_{VCO}$ corresponds to 128 ticks, then $T_{INT}$ corresponds to 128*(1−Δf) ticks, and the total phase jump ψ is calculated with reference to 128*(1−Δf) ticks per period $T_{INT}$.

In an example implementation, the interpolator 216 may be limited to performing a maximum phase jump, per clock cycle, in the range of [−6, 16] in a forward jump mode (i.e., 6 ticks out of 128 in a reverse direction and 16 ticks out of 128 in a forward direction). Conversely, in a reverse jump mode, the interpolator 216 may be limited to performing a phase jump in the range of [−6, 6] (i.e., 16 ticks out of 128 in the reverse direction and 6 ticks out of 128 in the forward direction). For example, whether the interpolator 216 set in the forward jump mode or the reverse jump mode may depend on the desired output frequency (e.g., if the desired output frequency is above a threshold, such as 1.1 GHz, the interpolator 216 is set in the forward jump mode, and if the desired output frequency is less than or equal to the threshold, the interpolator 216 is set in the reverse jump mode).

Accordingly, if a total desired phase jump (e.g., a relatively large phase jump during the ZPS that corresponds to greater than 16 ticks in the forward direction) is greater than a phase jump able to be performed by the interpolator 216 in a single clock cycle, the total desired phase jump (represented by a number of ticks) including the ZPS phase jump can be performed over multiple (e.g., 4-8) clock cycles. For example, if the ZPS phase jump corresponds to a phase jump of 0.875 T (112 ticks) and the frequency offset to be injected corresponds to a phase jump of 4 ticks, then the total desired phase jump is 116 ticks. The ZPS module 260 according to the principles of the present disclosure is configured to distribute the relatively large phase jump during the ZPS over multiple (e.g., 4-8) clock cycles, where one cycle corresponds to 1 T.

The total desired ZPS phase jump ψ is calculated and converted using the correction factor to ψ' according to ψ*(1−Δf) as described above. The total phase jump ψ' is further adjusted according to ψ'+N*Δf, where N is the number of clock cycles used to perform the total phase jump. For example, if N is 8, then the total actual phase jump to be performed over the 8 cycles is ψ'+N*Δf.

Assuming a frequency offset Δf corresponding to 4 ticks, where $T_{VCO}$ is 128 ticks, $T_{INT}$ corresponds to 128+4, or 132 ticks. The 4 ticks corresponding to the frequency offset are well within the range [−6, 16] of the interpolator 216, and can merely be performed every 1T cycle. However, accounting for the total phase jump ψ provided by the ZPS module 260 results in Ω=ψ*(1−Δf)+N*Δf. If Ω is less than or equal to 128 and N is, for example, 8, then interpolator 216 can simply perform the phase shift Ω over the 8 clock cycles since 128/8 is 16. In other words, the interpolator 216 is able to perform a phase shift of up to 16 ticks in the forward direction for 8 cycles, resulting in a maximum phase shift over 8 cycles of 128, and thereafter perform the phase shift of 4 ticks per cycle to achieve the frequency offset f of 4. For example, if Ω corresponds to 128 ticks, then the interpolator 216 can perform, over the 8 cycles, phase jumps of 16, 16, 16, 16, 16, 16, 16, and 16 ticks. However, if Ω corresponds to 40 ticks, then the interpolator 216 can perform, over the 8 cycles, phase jumps of 16, 16, 8, 0, 0, 0, 0, and 0 ticks, and then thereafter only perform the phase shift corresponding to the frequency offset.

If Ω' is greater than 128 and less than 132 and N is, for example, 8, then the ZPS module 260 can simply reframe the sampling timing to remove 1T (i.e., 128 132 ticks) from Ω. For example, if Ω is 130, after reframing Ω becomes −2 ticks (i.e., 130−132=−2), and the interpolator 216 may perform a phase shift of 2 ticks in the reverse direction, which together corresponds to a phase shift of 130 ticks in the forward direction.

If Ω is greater than 132, then the ZPS module 260 can reframe the sampling timing to remove kT (i.e., 132, 264, etc. ticks) from Ω and output incremental phase jumps according to the remaining Ω. For example, if Ω is 168 ticks, the ZPS module 260 removes 132 ticks to reduce Ω to 36 ticks, and then outputs phase jumps of 16, 16, 4, 0, etc.

Figure 4:
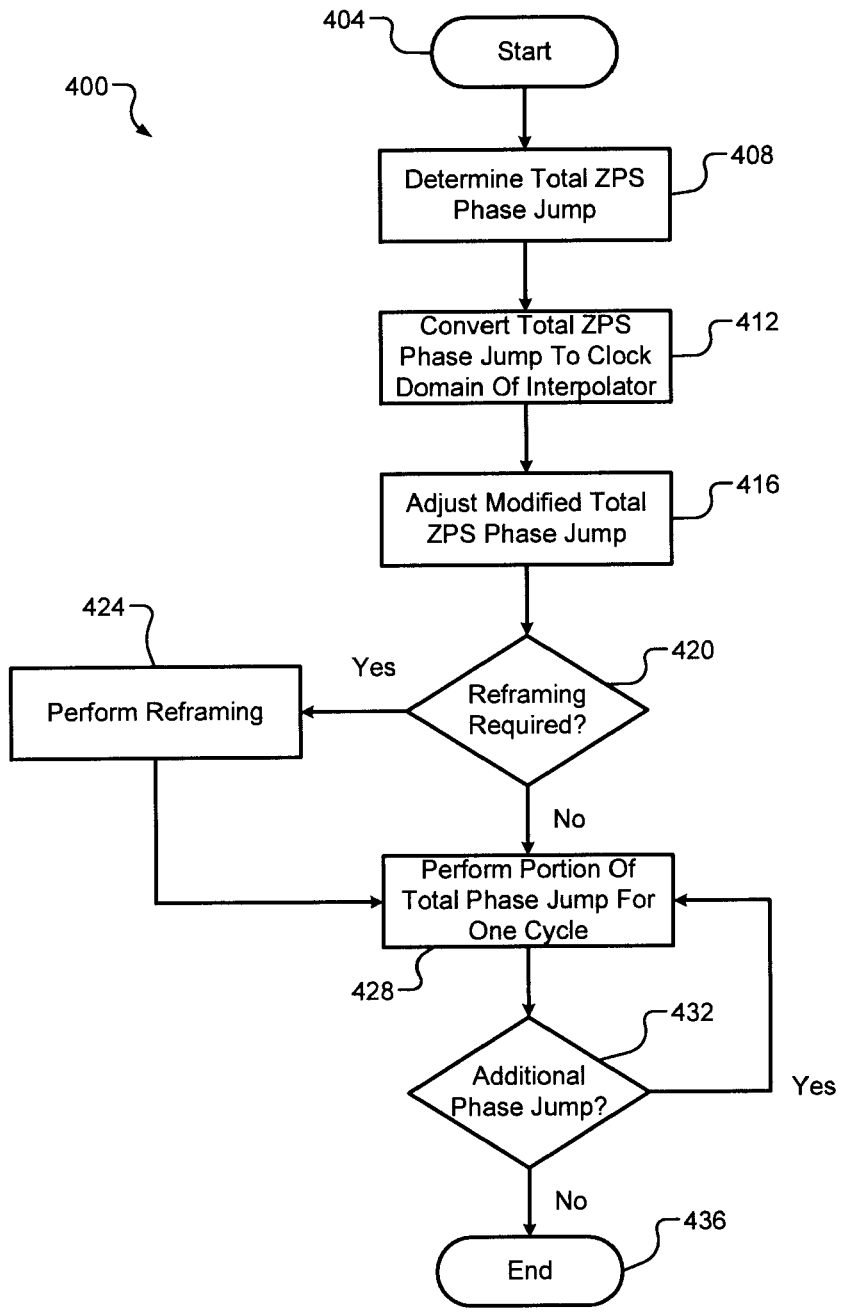
FIG. 4 is an example digital frequency offset injection method according to an embodiment of the present disclosure.

FIG. 4 shows an example digital frequency offset injection method 400 performed by, for example, components of the system 200, including the interpolator 216 and the ZPS module 260. The method 400 begins at 404. At 408, the method 400 determines a total ZPS phase jump ψ. At 412, the method 400 converts the total ZPS phase jump ψ to a clock domain of the interpolator 216 according to a digital frequency offset injected by the interpolator 216. For example, the method 400 multiples the total ZPS phase jump ψ by a correction factor (1−Δf) to generate a modified total phase jump ψ'. At 416, the method 400 adjusts the modified total phase jump ψ' by adding N*Δf, i.e. Ω=ψ+N*Δf where N is a number of clock cycles used by the interpolator 216 to perform the modified total phase jump Ω. At 420, the method 400 determines whether reframing is required. For example, the method 400 determines whether the modified total phase jump Ω corresponds to a number of ticks greater than a total phase jump that the interpolator 216 can perform in N cycles. If true, the method 400 continues to 424. If false, the method 400 continues to 428. At 424, the method 400 performs reframing. For example, the method 400 subtracts a number of ticks corresponding to kT from Ω, where k is an integer (e.g., 1T, 2T, etc.).

At 428, the method 400 performs a portion of the total phase jump θ' corresponding to one clock cycle (e.g., 16 or fewer ticks). At 432, the method 400 determines whether any additional amount of the modified total phase jump θ' needs to be performed. If true, the method 400 continues to 432. If false, the method 400 ends at 436.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term 'module' or the term 'controller' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium include nonvolatile memory circuits (such as a flash memory circuit or a mask read-only memory circuit), volatile memory circuits (such as a static random access memory circuit and a dynamic random access memory circuit), and secondary storage, such as magnetic storage (such as magnetic tape or hard disk drive) and optical storage.

The apparatuses and methods described in this application may be partially or fully implemented by a special purpose computer created by configuring a general purpose computer to execute one or more particular functions embodied in computer programs. The computer programs include processor-executable instructions that are stored on at least one non-transitory, tangible computer-readable medium. The computer programs may also include or rely on stored data. The computer programs may include a basic input/output system (BIOS) that interacts with hardware of the special purpose computer, device drivers that interact with particular devices of the special purpose computer, one or more operating systems, user applications, background services and applications, etc.

The computer programs may include: (i) assembly code; (ii) object code generated from source code by a compiler; (iii) source code for execution by an interpreter; (iv) source code for compilation and execution by a just-in-time compiler, (v) descriptive text for parsing, such as HTML (hypertext markup language) or XML (extensible markup language), etc. As examples only, source code may be written in C, C++, C#, Objective-C, Haskell, Go, SQL, Lisp, Java®, ASP, Perl, Javascript®, HTML5, Ada, ASP (active server pages), Perl, Scala, Erlang, Ruby, Flash®, Visual Basic®, Lua, or Python®.

None of the elements recited in the claims is intended to be a means-plus-function element within the meaning of 35 U.S.C. §112(f) unless an element is expressly recited using the phrase "means for", or in the case of a method claim using the phrases "operation for" or "step for".

What is claimed is:

1. A system for providing an accumulated phase to an interpolator of a read channel, the interpolator configured to provide a digital clock signal, the system comprising:
    a frequency accumulator configured to generate a frequency offset based on a difference between the digital clock signal and a desired clock signal;
    a zero phase start module configured to, during a zero phase start, output an incremental phase jump; and
    a phase accumulator configured to generate the accumulated phase based on
        the difference between the digital clock signal and the desired clock signal,
        during the zero phase start, the incremental phase jump output by the zero phase start module, and
        a selected one of the frequency offset generated by the frequency accumulator and a predetermined frequency offset.

2. The system of claim 1, wherein the incremental phase jump output by the zero phase start module includes the frequency offset.

3. The system of claim 1, wherein the incremental phase jump corresponds to a desired total phase jump reduced by an integer.

4. The system of claim 1, wherein the incremental phase jump corresponds to a desired total phase jump divided by a number of clock cycles used to perform the desired total phase jump.

5. The system of claim 1, further comprising a multiplexer configured to (i) receive the frequency offset generated by the frequency accumulator, (ii) receive a second value, and (iii) selectively output one of the frequency offset generated by the frequency accumulator and the second value based on a zero phase start selection signal.

6. The system of claim 5, wherein the zero phase start module is configured to generate the zero phase start selection signal, and wherein the zero phase start selection signal causes the multiplexer to (i) output the second value during the zero phase start and (ii) output the frequency offset generated by the frequency accumulator subsequent to the zero phase start.

7. The system of claim 5, wherein the second value is 0.

8. The system of claim 1, further comprising the interpolator, wherein
    the interpolator is configured to provide the digital clock signal based on an output frequency of a voltage controlled oscillator, and
    the output frequency of the voltage controlled oscillator is selected such that a biasing digital frequency offset, corresponding to a middle point between a minimum frequency offset and a maximum frequency offset, is applied to achieve a desired output frequency, wherein the minimum frequency offset and the maximum frequency offset are determined according to a phase jump range of the interpolator.

9. The system of claim 1, wherein (i) the incremental phase jump is based on a total desired phase jump as modified by a correction factor, and (ii) the correction factor is based on a frequency offset injected by the interpolator into the digital clock signal.

10. The system of claim 1, wherein the frequency offset generated by the frequency accumulator is not provided to the phase accumulator during the zero phase start.

11. A method for providing an accumulated phase to an interpolator of a read channel, the interpolator configured to provide a digital clock signal, the method comprising:
generating a frequency offset based on a difference between the digital clock signal and a desired clock signal;
during a zero phase start, outputting an incremental phase jump; and
generating the accumulated phase based on
the difference between the digital clock signal and the desired clock signal,
during the zero phase start, the incremental phase jump, and
a selected one of the generated frequency offset and a predetermined frequency offset.

12. The method of claim 11, wherein the incremental phase jump includes the frequency offset.

13. The method of claim 11, wherein the incremental phase jump corresponds to a desired total phase jump reduced by an integer.

14. The method of claim 11, wherein the incremental phase jump corresponds to a desired total phase jump divided by a number of clock cycles used to perform the desired total phase jump.

15. The method of claim 11, further comprising, using a multiplexer, (i) receiving the generated frequency offset, (ii) receiving a second value, and (iii) selectively outputting one of the generated frequency offset and the second value based on a zero phase start selection signal.

16. The method of claim 15, wherein the zero phase start selection signal causes the multiplexer to (i) output the second value during the zero phase start and (ii) output the generated frequency offset subsequent to the zero phase start.

17. The method of claim 15, wherein the second value is 0.

18. The method of claim 11, further comprising providing the digital clock signal based on an output frequency of a voltage controlled oscillator, wherein
the output frequency of the voltage controlled oscillator is selected such that a biasing digital frequency offset, corresponding to a middle point between a minimum frequency offset and a maximum frequency offset, is applied to achieve a desired output frequency, wherein the minimum frequency offset and the maximum frequency offset are determined according to a phase jump range of the interpolator.

19. The method of claim 11, wherein (i) the incremental phase jump is based on a total desired phase jump as modified by a correction factor, and (ii) the correction factor is based on a frequency offset injected by the interpolator into the digital clock signal.

20. The method of claim 11, wherein the generated frequency offset is not provided during the zero phase start.

* * * * *